Figure 1:
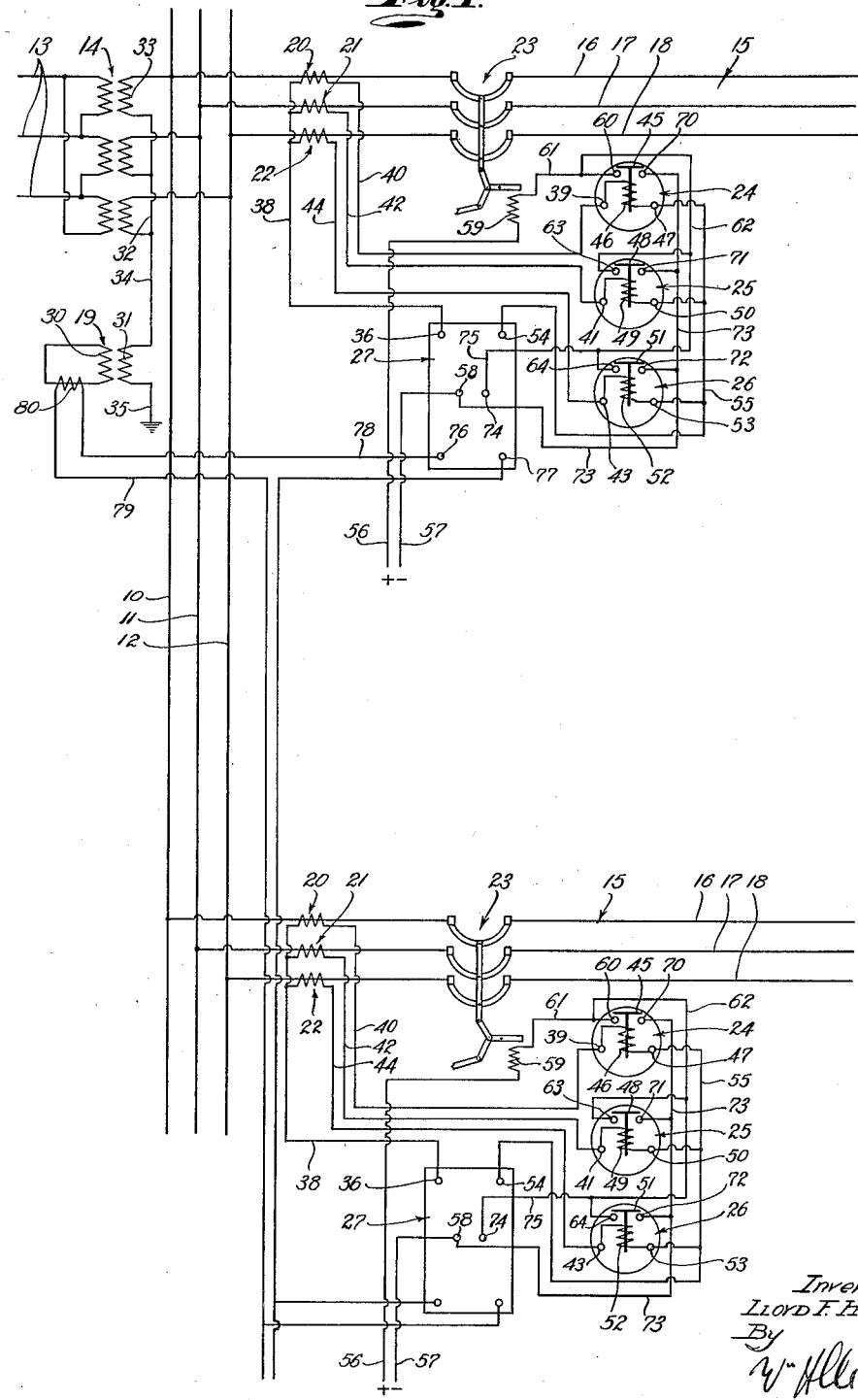

June 29, 1937.  L. F. HUNT  2,085,364
PROTECTIVE SYSTEM FOR ELECTRICAL DISTRIBUTING SYSTEMS
Filed Jan. 21, 1935   2 Sheets-Sheet 1

Inventor
Lloyd F. Hunt
By
His Attorney

June 29, 1937.    L. F. HUNT    2,085,364
PROTECTIVE SYSTEM FOR ELECTRICAL DISTRIBUTING SYSTEMS
Filed Jan. 21, 1935    2 Sheets-Sheet 2

Inventor
Lloyd F. Hunt
By
His Attorney

Patented June 29, 1937

2,085,364

UNITED STATES PATENT OFFICE 2,085,364

PROTECTIVE SYSTEM FOR ELECTRICAL DISTRIBUTING SYSTEMS

Lloyd F. Hunt, Glendale, Calif.

Application January 21, 1935, Serial No. 2,732

5 Claims. (Cl. 175—294)

This invention has to do with the protection of electrical equipment or of a power distributing system and has particular reference to a control device and a system particularly suited for the protection of that type of electrical distributing system ordinarily known as a radial feeder system.

Electrical distribution systems having feeder lines running out from the central or supply station without interconnecting substations are commonly known as radial feeder systems. There are two commonly used types of circuits found in radial feeder systems, one being delta connected and the other star connected. The present invention is applicable generally to radial feeder systems and may be advantageously applied to either a delta or star system, as will be hereinafter described.

In the protection of radial feeder systems, it is comparatively simple to protect against phase short circuits as there is no possibility of feeding power into the station from any feeder. Phase short circuits can be effectively handled by overload currrent relays such as are commonly known to those skilled in the art. It is more difficult, however, to protect such systems against phase to ground short circuits, and it is an object of this invention to provide an effective, dependable, and simple system of protection for such ground faults.

Ground faults are usually difficult to protect against because the usual ground fault occurring on a line has an impedance about three times that common to a phase to phase fault. The high impedance of a ground fault may be due to high contact resistance at the fault, high earth resistance, high impedance due to the construction of the line or feeder or to other such factors.

It is an object of this invention to provide a protective system applicable, generally, to radial feeder systems whereby such feeder systems are effectively, dependably, and accurately protected against ground faults such as are not effectively relayed or detected by systems heretofore available.

A feature of the present invention is the provision of a transformer bank from the main distributing busses to ground which establishes a ground circuit for operation of suitable relays when a ground fault occurs in the system.

It is an object of the present invention to provide a system in which a single transformer bank to ground is necessary in a protective system protecting a plurality of feeder or distributing lines extending radially or out from the main power source or busses.

Another object of this invention is to provide a small ground bank or a ground transformer of high impedance in order that a ground fault such as normally occurs in a system of the type being protected has about the same impedance as the transformer so that a normal ground fault will cause the neutral or balance of the distribution circuit to be shifted and the current somewhat affected. Through the shifting of the neutral or through unbalance of the circuit I gain operation of relays which control suitable circuit breakers.

Figure 2:
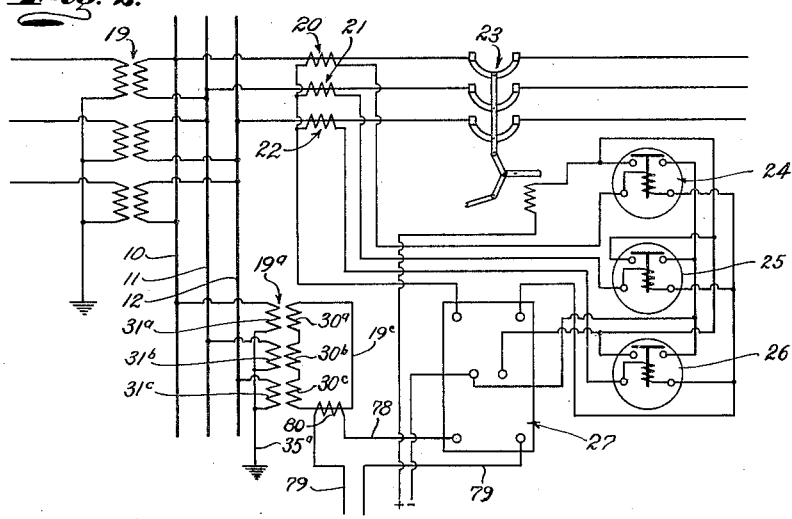

The various objects and features of my present invention will be best and more fully understood from the following detailed description of a typical form or embodiment of the invention in which description I set forth the invention as applied to a radial feeder system delta connected and also a radial feeder system star connected, and throughout which description I make reference to the accompanying drawings, in which:

Fig. 1 is a diagrammatic view illlustrating a star connected radial feeder system having two distributing or feeder lines. Fig. 2 is a diagrammatic view of a portion of a radial feeder system delta connected showing the manner in which my invention may be connected in a radial feeder system that is delta connected; and Fig. 3 is an enlarged diagrammatic view illustrating the relay provided by the invention.

My present invention being applicable generally to electrical distribution systems such as are known as radial feeder systems, I will first describe a typical form and application of the invention as applied to a star connected radial feeder system and will thereafter describe generally the manner in which the invention may be applied to a delta connected radial feeder system.

Figure 3:
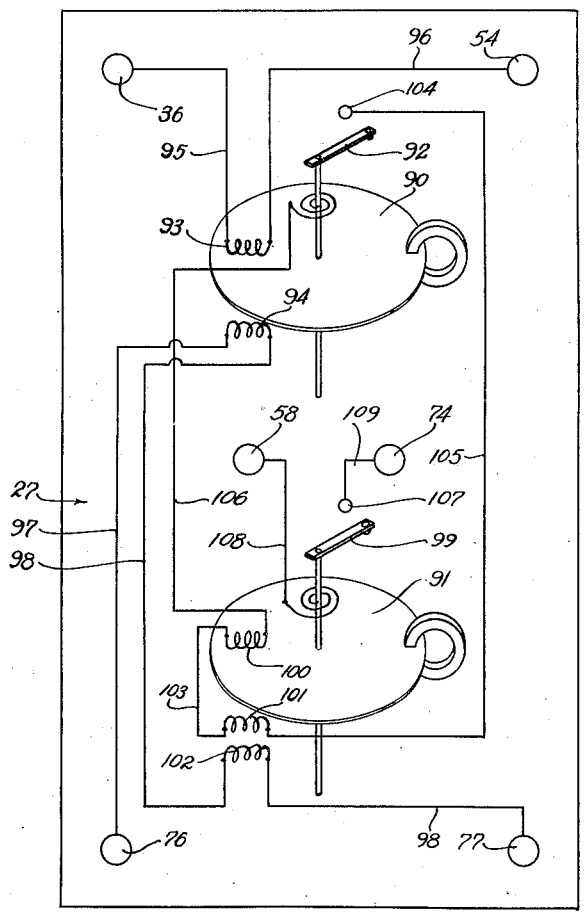

Referring now to Figs. 1 and 3 of the drawings, numerals 10, 11, and 12 designate the poles or bus bars, as I will hereinafter term them, of the main or power circuit. The bus bars may, as far as the present invention is concerned, be connected in any suitable manner to a suitable source of electrical supply. In the drawings I have shown the bus bars connected with power supply lines 13 through suitable transformers 14. Radial feeder lines 15 are connected to extend from the bus bars, each feeder line being carried by wires 16, 17, and 18 connected with bus bars 10, 11, and 12, respectively. It is to be understood that the feeder lines extend to the point at which the energy is to be supplied and that the load may be connected with the wires 16, 17, and 18 in the usual manner.

My present invention provides a protective system in combination or connection with the primary parts of the radial feeder system hereinabove described. The present invention provides, generally, a ground transformer 19, current transformers 20, 21, and 22 to be energized from feeder wires 16, 17, and 18, respectively, a circuit breaker 23 controlling the wires 16, 17, and 18, over-current relays 24, 25, and 26 connected with the current transformers 20, 21, and 22, respectively, and a relay 27 connected with the transformer 19, transformers 20, 21, and 22 and the relays 24, 25, and 26 as will be hereinafter described.

In carrying out my present invention, a radial feeder system having a plurality of feeder lines may be protected by employing a single ground transformer 19 for the entire system and one of each of the other elements of the invention hereinabove referred to for each feeder line. This application or distribution will be readily understood from the diagram Fig. 1. The several relays 27 connected in the protective system are connected in series with the secondary winding 30 of the ground transformer 19. The other elements of the protective system provided in connection with each feeder line are related and connected the same for each feeder line, and, therefore, I will describe these units in connection with one feeder line, it being understood that such description may apply to as many feeder lines as there may be in the entire system.

In the case of a star connected system such as is now under consideration, one terminal of the primary winding 31 of the ground transformer 19 is connected by a connection 34 with the neutral or common connection 32 of the secondary windings 33 of transformers 14. The other terminal of the primary winding 31 of transformer 19 is grounded through a suitable ground connection 35.

The current transformers 20, 21, and 22 are current transformers arranged to be energized from lines 16, 17, and 18, respectively. One terminal of each of the transformers 20, 21, and 22 is connected with terminal 36 of relay 27 by a common connection 38. The other terminal of transformer 20 is connected with terminal 39 of relay 24 by connection 40. The other terminal of transformer 21 is connected with terminal 41 of relay 25 by connection 42; and the other terminal of transformer 22 is connected with terminal 43 of relay 26 by connection 44. Terminals 47, 50, and 53 of relays 24, 25, and 26, respectively, are connected with terminal 54 of relay 27 by a common connector 55.

The over-current relay 24 includes a contact 45 controlled by a winding 46 connected between terminal 39 and terminal 47. The relay 25 has a contact 48 controlled by a winding 49 connected between terminal 41 and terminal 50; and relay 26 has a contact 51 controlled by a winding 52 connected between terminal 43 and terminal 53.

The circuit breaker 23 which may be of any suitable type, form or construction is adapted to be controlled or tripped from an independent power circuit carried by lines 56 and 57. The line 57 connects with terminal 58 of relay 27 while line 56 connects with one terminal of a control winding, or the like, 59 related to the circuit breaker 23. The other terminal of winding 59 is connected with terminal 60 of relay 24 by suitable connection 61. A common connector 62 connects the terminal 60 of relay 24 with terminal 63 of relay 25 and a terminal 64 of relay 26. The contact 45 of relay 24 is adapted to control connection between terminal 60 and a terminal 70. The contact 48 of relay 25 is adapted to control connection between terminal 63 and a terminal 71 and the contact 51 of relay 26 is adapted to control connection between a terminal 64 and a terminal 72. The terminals 70, 71, and 72 are joined by a common connector 73 which connects them with terminal 58 of relay 27. A suitable connection 75 connects a terminal 74 of relay 27 with the connection 62 which joins terminals 60, 63, and 64 of relays 24, 25, and 26, respectively.

The relay 27 has terminals 76 and 77 through which it is connected with the ground transformer 19 through suitable connections 78 and 79, respectively. The circuit carried by connections 78 and 79 is energized from the ground transformer 19, preferably through a suitable transformer 80 connected in the circuit of the secondary winding 30 of transformer 19.

The relay 27 which is a special feature of the present invention is connected to be responsive to the combined action of current from any of the current transformers 20, 21, or 22 and the ground transformer 19. The relay 27 illustrated diagrammatically in detail in Fig. 3 of the drawings includes two rotatable elements 90 and 91 and suitable windings and contacts about to be described. The rotatable element 90 controls a movable contact 92 and is under control of a winding 93 and a winding 94. The winding 93 has one terminal connected with the terminal 36 by a suitable connection 95 and the other terminal connected with the terminal 54 by a suitable connection 96. Being thus connected, winding 93 is energized by flow of current induced in any of the current transformers 20, 21, or 22, the circuit being completed through the connection 38 which connects terminal 36 with the transformers and connections 40, 42, and 44, windings 46, 49, and 52, and connection 55 which connects the transformers with terminal 54 of relay 27 through the relays 24, 25, and 26. The winding 94 is energized from the ground transformer 19 in that it has one terminal connected with terminal 76 by suitable connection 97 and the other terminal connected with terminal 77 by suitable connection 98. Terminal 76 as hereinabove described is connected with the ground transformer by connection 78, while terminal 77 is connected with the ground transformer through connection 79.

The rotatable element 91 of relay 27 controls a movable contact 99 and is controlled or operated by a winding 100 and a winding 101, the latter being under control of a winding 102 connected in series in the connection 98. The windings 100 and 101 are connected in series in a circuit controlled by the contact 92. The windings 100 and 101 are connected together by a suitable connection 103, while winding 100 is connected with the movable contact 92 by suitable connection 106 and winding 101 is connected with a stationary contact 104 by suitable connection 105. When the element 90 moves in the proper direction under the influence of windings 93 and 94, contact 92 engages contact 104, thus completing the circuit in which windings 100 and 101 are connected. If at this time current is flowing in winding 102, the movable element 91 operates to move the contact 99 into engagement with a stationary contact 107. The movable contact 99 is connected with terminal 58 by suitable connection 108 while the contact 107 is connected with terminal 74 by suitable connection 109. The engagement of contact 107 by contact 99 closes the circuit to the circuit breaker control winding 59.

From the foregoing description, it is believed that the operation of the system will be readily understood. In the event of a ground fault, even though it causes only a slight amount of ground current flow the current will be detected by the current transformers which will pass current through winding 93 of relay 27. This flow, even though small, is sufficient to operate the sensitive movable element 90 of the relay, the disc or movable element 90 being caused to move under the influence of current in winding 93 and current in winding 94, the winding 94 being connected with the ground transformer 19, as hereinabove described. When the contact 92 closes or engages contact 104, and if there is current in winding 102, the movable element 91 of relay 27 operates, closing contact 99 with contact 107. It is necessary to have current in winding 102 and winding 100 in order to obtain movement of the member 91, and, therefore, it is necessary to have contact 92 closed or in engagement with contact 104 before the relay 27 can function to cause tripping of the circuit breaker through the winding 59 connected as hereinabove described.

As an example of a typical installation on a system designed to carry three amperes relays 25 and 26 may be set to trip at about six hundred amperes or more. These relays are preferably time delay relays so that they do not trip under momentary overload. Transformer 19 is small in capacity giving a relatively high impedance to ground. In a case such as I have mentioned it may have a capacity of about ten amperes. It is desirable to have low ground current, as ground current is dangerous to life and to property and other electrical equipment, such as telephone systems.

In applying the present invention to a radial feeder system that is delta connected, the various elements or units are related and operate as above described with the exception of the ground transformer. In Fig. 2 of the drawings, I illustrated diagrammatically a portion of a radial feeder system that is delta connected, from which diagram it will be obvious that the current transformers, over-current relays, circuit breaker, and relay 27 are connected and will operate as hereinabove described. In this case, however, the ground transformers 19ᵃ includes three primary windings 31ᵃ, 31ᵇ, and 31ᶜ, connected between a ground connection 35ᵈ and the bus bars 10, 11, and 12, respectively. The secondary windings 30ᵃ, 30ᵇ, and 30ᶜ of the transformers are connected in series in a circuit formed by a suitable connection 19ᶜ. A transformer 80 is provided to be energized by flow in the connection 19ᶜ and the relays 27 are connected in series with the transformer 80 through connections 78 and 79. It will be apparent that the transformer bank 19ᵃ just described establishes a ground circuit on which the protective system operates, as hereinabove described.

Having described only a typical form of the invention and typical applications of the invention, I do not wish to be limited or restricted to the specific forms and applications herein set forth, but wish to reserve to myself any modifications or variations that may appear to those skilled in the art or fall within the scope of the following claims.

Having described my invention, I claim:

1. Protective equipment for a three phase radial feeder system having a plurality of radial lines including: a single ground-responsive transformer connecting the system with ground and having one point of its primary grounded, and a protective unit for each of said radial lines comprising, a current transformer energized by the line, a circuit breaker controlling the line, the circuit breaker embodying a trip coil, a source of electrical energy and a ground directional relay, said directional relay comprising a rotor, a winding inductively related thereto and connected to receive current from the said current transformers, a second rotor, two windings connected in series with one another and with the secondary of the said ground transformer, one of said two last-named windings being inductively related wtih the first rotor and the other with the second rotor, a third set of two coils connected in series with one another and inductively related with the second rotor, a movable contact carried by the first rotor, and a stationary contact cooperating therewith, conductors connecting the free terminals of said two coils to said two contacts whereby the first rotor controls the resulting circuit, one coil of the third set being inductively related to one of the windings which cooperates with the second rotor, a movable contact carried by the second rotor and a stationary contact cooperating therewith, said last-named pair of contacts being interposed in series with the trip winding and the source of energy, to control said circuit breaker, in response to energy from the current transformer and current flow resulting from a ground on said line.

2. Protective equipment for a three phase radial feeder system including: current transformers energized by the feeder to be protected, a ground transformer connected between the said feeder and ground and having one point of its primary grounded, a circuit breaker for the said feeder, the breaker embodying a trip winding, a source of electrical energy, and a ground-current directional relay, said directional relay comprising a rotor, a winding inductively related thereto and connected to receive current from the said current transformers, a second rotor, two windings connected in series with one another and with the secondary of the said ground transformer, one of said two last-named windings being inductively related with the first rotor and the other with the second rotor, a third set of two coils connected in series with one another and inductively related with the second rotor, a movable contact carried by the first rotor, and a stationary contact cooperating therewith, conductors connecting the free terminals of said coils to said two contacts whereby the first rotor controls the resulting circuit, one coil of the third set being inductively related to one of the windings which cooperates with the second rotor, a movable contact carried by the second rotor and a stationary contact cooperating therewith, said last-named pair of contacts being interposed in series with the trip winding and the source of energy, to control said circuit breaker, in response to energy from the current transformers and current flow due to a ground fault on said feeder to be protected.

3. Protective equipment for a three phase radial feeder system having a plurality of radial lines including: a single ground-responsive transformer connecting the system with ground and having a high impedance, the ground-responsive transformer comprising, a grounded primary winding, and a secondary winding, and a protective unit for each line including a current transformer energized by the line, a circuit breaker controlling the line and including a trip coil, a ground directional relay, said directional relay comprising a rotor, a winding inductively related thereto and connected to receive current from the said current transformers, a second rotor, two windings connected in series with one another and with the secondary of the said ground transformer, one of said two last-named windings being inductively related with the first rotor and the other with the second rotor, a third set of two coils connected in series with one another and inductively related with the second rotor, a movable contact carried by the first rotor, and a stationary contact cooperating therewith, conductors connecting the free terminals of said two coils to said two contacts whereby the first rotor controls the resulting circuit, one coil of the third set being inductively related to one of the windings which cooperates with the second rotor, a movable contact carried by the second rotor and a stationary contact cooperating therewith, said last-named pair of contacts being interposed in series with the trip winding and the source of energy, to control said circuit breaker in response to energy from said current transformers and current flow from the secondary winding of the ground-responsive transformer, due to a ground fault on the feeder to be protected.

4. Protective equipment for a three phase radial feeder system having a plurality of radial lines extending from a supply station including: a single ground-responsive transformer at the supply station connecting the system with ground and comprising a grounded primary winding and a secondary winding, and a protective unit for each radial line, including a current transformer energized by the line, a circuit breaker controlling the line and embodying a trip coil, a ground directional relay, said directional relay comprising a rotor, a winding inductively related thereto and connected to receive current from the said current transformers, a second rotor, two windings connected in series with one another and with the secondary of the said ground transformer, one of said two last-named windings being inductively related with the first rotor and the other with the second rotor, a third set of two coils connected in series with one another and inductively related with the second rotor, a movable contact carried by the first rotor, and a stationary contact cooperating therewith, conductors connecting the free terminals of said two coils to said two contacts whereby the first rotor controls the resulting circuit, one coil of the third set being inductively related to one of the windings which cooperates with the second rotor, a movable contact carried by the second rotor and a stationary contact cooperating therewith, said last-named pair of contacts being interposed in series with the trip winding and the source of energy, to control said circuit breaker in response to energy from said current transformers and current flow from the secondary winding of the ground-responsive transformer, due to a ground fault on the feeder to be protected.

5. Protective equipment for a radial feeder system having a plurality of radial lines extending from a supply station including: a single ground-responsive transformer at the supply station connecting the system with ground and comprising a grounded primary winding and a secondary winding, and a protective unit for each radial line, including a current transformer energized by the line, a circuit breaker controlling the line and embodying a trip coil, a ground directional relay including an energizing circuit for the trip coil, said directional relay comprising a rotor, a winding inductively related thereto and connected to receive current from the said current transformers, a second rotor, two windings connected in series with one another and with the secondary of the said ground transformer, one of said two last-named windings being inductively related with the first rotor and the other with the second rotor, a third set of two coils connected in series with one another and inductively related with the second rotor, a movable contact carried by the first rotor, and a stationary contact cooperating therewith, conductors connecting the free terminals of said two coils to said two contacts whereby the first rotor controls the resulting circuit, one coil of the third set being inductively related to one of the windings which cooperates with the second rotor, a movable contact carried by the second rotor and a stationary contact cooperating therewith, said last-named pair of contacts being interposed in series with the trip winding and the source of energy, to control said circuit breaker.

LLOYD F. HUNT.